US008233999B2

(12) United States Patent
Herberger et al.

(10) Patent No.: US 8,233,999 B2
(45) Date of Patent: Jul. 31, 2012

(54) SYSTEM AND METHOD FOR INTERACTIVE VISUALIZATION OF MUSIC PROPERTIES

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 197 days.

(21) Appl. No.: 12/869,908

(22) Filed: Aug. 27, 2010

(65) Prior Publication Data

US 2011/0213475 A1    Sep. 1, 2011

Related U.S. Application Data

(60) Provisional application No. 61/237,863, filed on Aug. 28, 2009.

(51) Int. Cl.
*G06F 17/00* (2006.01)

(52) U.S. Cl. ............................ 700/94; 707/916; 715/968

(58) Field of Classification Search ...................... 700/94
See application file for complete search history.

(56) References Cited

U.S. PATENT DOCUMENTS

| | | | |
|---|---|---|---|
| 5,754,179 A | 5/1998 | Hocker et al. | |
| 5,886,698 A | 3/1999 | Sciammarella et al. | |
| 6,775,659 B2 | 8/2004 | Clifton-Bligh | |
| 6,925,608 B1 | 8/2005 | Neale et al. | |
| 6,928,433 B2 | 8/2005 | Goodman et al. | |
| 7,295,977 B2 | 11/2007 | Whitman et al. | |
| 7,434,170 B2 | 10/2008 | Novak et al. | |
| 7,454,329 B2 | 11/2008 | Abe et al. | |
| 7,582,823 B2 | 9/2009 | Kim et al. | |
| 2005/0010589 A1 | 1/2005 | Novak et al. | |
| 2005/0022132 A1 | 1/2005 | Herzberg et al. | |
| 2005/0131688 A1 | 6/2005 | Goronzy et al. | |
| 2006/0112808 A1 | 6/2006 | Kiiskinen et al. | |
| 2006/0181537 A1 | 8/2006 | Vasan et al. | |
| 2007/0107584 A1 | 5/2007 | Kim et al. | |
| 2007/0176922 A1 | 8/2007 | Ikeda et al. | |
| 2007/0233726 A1* | 10/2007 | Torrens et al. | 707/102 |
| 2007/0245257 A1 | 10/2007 | Chan et al. | |
| 2008/0257134 A1 | 10/2008 | Oppenheimer | |
| 2008/0301128 A1 | 12/2008 | Gandert et al. | |
| 2008/0313222 A1* | 12/2008 | Vignoli et al. | 707/104.1 |
| 2008/0314228 A1 | 12/2008 | Dreyfuss et al. | |
| 2009/0013004 A1 | 1/2009 | Manukyan et al. | |
| 2009/0132077 A1 | 5/2009 | Fujihara et al. | |
| 2009/0132591 A1 | 5/2009 | Toms et al. | |
| 2009/0193351 A1 | 7/2009 | Lee et al. | |
| 2009/0228481 A1 | 9/2009 | Neale et al. | |

* cited by examiner

*Primary Examiner* — Walter F Briney, III
(74) *Attorney, Agent, or Firm* — Fellers, Snider, Blankenship, Bailey & Tippens, P.C.; Terry L. Watt (57) ABSTRACT

There is provided a visual music classification and management system. Each music item in a user's collection will be analyzed to identify its musical characteristics along with some estimate of the degree of confidence associated with that characteristic. By using characteristics, so-called music aspects, it will be possible to efficiently categorize the contents of a music database. Each music item will be stored in a database with the calculated values as will the characterizing aspect. The database contents will be displayed by drawing icons representing the music items on a user's screen, with the size (or other visual aspect) of the icon reflecting the degree of confidence with that categorization. Searches of the database will be performed by on-screen manipulations of the aspect cluster-positioned music items.

15 Claims, 5 Drawing Sheets

SYSTEM AND METHOD FOR INTERACTIVE VISUALIZATION OF MUSIC PROPERTIES

CROSS-REFERENCE TO RELATED CASES

This application claims the benefit of U.S. provisional patent application Ser. No. 61/237,863, filed on Aug. 28, 2009, and incorporates such provisional application by reference into this disclosure as if fully set out at this point.

FIELD OF THE INVENTION

The present invention relates generally to the field of data processing and more specifically to methods, systems and products for visual presentation, searching and accessing of digital audio content.

In recent years digital multimedia content has become increasingly available to the public. High-performance home computers, the ever increasing availability of broadband data-networks, efficient data compression methods and high capacity storage media have all played a role in the increasing access to and demand for audio content among individual users as well as in the corporate sector. Today audio content is almost exclusively created, stored and transferred in digital form.

When a digital audio content collection has reached a certain size, a number of problems manifest themselves. The main problem is that as the size of the music collection grows, the user increasingly loses the ability to keep track of its content. Locating a song that matches multiple criteria (e.g., a slow song that is sung by a male singer in a jazz style) in a music database that contains thousands of songs is difficult or impossible, absent intimate personal knowledge of the content of such a database.

The conventional approach to solving this problem is to store the song files in a database, with the user bearing the responsibility for manually examining each song and assigning to it various criteria that can subsequently be used to find it again. Although some of these characteristics might be relatively easy to determine (e.g., male or female vocalist, music style, etc.), others would be more difficult (e.g., overall pitch, key, tempo in beats per minute ("BPM"), etc.). Most users simply do not have the time, patience, training, etc., to go through an entire music collection and assign such characteristics to each song, and that is certainly true of users that own a large music collection.

This conventional database approach does not provide easy categorization and retrieval of a user's digital content, e.g., the user must manually assign parameters to each music item so that that item can be located again in the future.

Thus, what is needed is a system and method where the entirety of a digital audio music collection is made easily accessible and that provides a graphical approach to organizing and accessing the contents of a database via a graphical user interface according to the inherent properties. Furthermore, it would be preferable if the system were to automatically determine these inherent properties of each song so that the user is freed from that task.

Heretofore, as is well known in the media editing industry, there has been a need for an invention to address and solve the disadvantages of prior art methods. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for dynamic visual presentation of digital audio content and for interaction with the visual presentation to efficiently search a music database. According to a first preferred embodiment, the instant invention will allow a user to manage and access his or her music collection in a new way. In the preferred embodiment, each music item in a user's music collection will be analyzed by the instant invention to identify its musical characteristics. These musical characteristics will preferably be extracted from each music item. The extracted data values representing these characteristics will then preferably be mathematically processed and associated with different musical aspects of the work. In this way, each music item in the user's music database will be categorized according to its musical characteristics. Additionally a degree of confidence associated with the categorization will preferably be estimated, e.g., a music item with an 85% confidence value for the aspect "slow" represents a music item that primarily features a slow tempo. By using such aspects as slow or fast tempo, calm or aggressive rhythm (e.g., syncopation or not), percussive (or not), female/male singer, electro, jazz, speech etc., it will be possible to efficiently characterize and categorize the content of each musical file. Each individual music item will preferably be stored in a database and the calculated values for each aspect will also preferably be stored therein.

In a preferred embodiment, a user will then be able to query the music database utilizing and manipulating a graphical user interface that preferably contains graphical representations of each of the music items in the database. The starting point will preferably be a screen display that shows clusters of icons (e.g., circles) that represent musical items that are stored in the database. The clusters will preferably be organized by aspects, with the confidence values associated with each musical item being used to define the position and size of the individual graphical representations (i.e., the icons) within the clusters. Music items that have similar aspects are grouped or clustered together. Each icon, if clicked or hovered over, will preferably play the associated song, insert it into a play list, copy it to another location for further processing, etc., according to a users desire.

The user will then be given the opportunity to conduct more complex searches on the music database by using on-screen manipulation of the displayed clusters. In one preferred embodiment, the user will be able to seize (e.g., click on or otherwise select) one cluster and drag it to and onto another cluster. Performing this operation will preferably cause the instant invention to identify all music items in at least the two selected clusters (or, in some cases the entire database) that satisfy the requirements of both clusters.

When the user combines two or more clusters, those musical items that satisfy all of the requirements at some level of confidence will preferably have their graphical representations (icons) highlighted on-screen (e.g., by using a particular color, shade, gray scale, cross hatching, etc.).

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Referring now to the drawings, wherein the reference numerals indicate the same parts throughout the several views, there is provided a system and method for dynamic visual presentation of digital audio content and manipulation of the visual presentation to search a music database. Additionally the instant method provides a new way of viewing the contents of the digital library. The user will preferably be provided with a graphical user interface that visually represents the contents of a digital library according to each song's most characterizing musical properties. The instant invention will preferably enable the user to maneuver within the visual representation by using familiar computer selection and interaction mechanisms. Additionally the user will preferably be able to interact with the visual representation to further refine the search criteria.

By way of general explanation and in accord with the preferred embodiment, it is to be understood that when the phrase "interactive visualization of music properties" is used herein, that phrase will preferably be interpreted as meaning providing an automatic process that creates a visual representation of the contents of a digital content library organized according to the characterizing musical properties of the digital content. The instant invention will preferably create an organized visual representation based on generated or stored data associated with the music items stored in the digital content library. By interacting with individual graphical objects that represent music items, the user will preferably be able to visually search the database. The user will be able to visually combine graphical objects having one musical property with objects having another, thereby selecting the music items (graphical objects) that preferably contain values above a predetermined threshold for both musical properties.

The preferred embodiment of the instant invention utilizes a combination of creation and analysis operations, with both operations preferably being implemented interdependently. The analysis operations will preferably provide the data foundation for the creation steps which implement the graphical user interface. The graphical user interface will preferably be automatically presented to the user upon activation of a program or program part that embodies the instant invention. The user will preferably be provided with a graphical user interface that displays a representation of a substantial part of the content of a digital library. Furthermore, the instant invention will preferably provide the user with the ability to use left/right, forward/backward mouse motions to explore the database content. The analysis and creation operations will preferably be executed without user interaction and, preferably, without user input. The analysis operations will provide the data that is used in the creation of the visual representation.

Note that, in some preferred embodiments, the database will be a traditional (e.g., hierarchical, relational, flat, etc.) database. However, those of ordinary skill in the art will recognize that a database usable by the instant invention might consist of, for example, a number of separate digital audio files organized into a file/directory structure. As such, when the term "database" is used herein that term should be broadly construed to include formal, as well as informal, arrangements. Finally, it should be noted and remembered that the database might reside locally on the user's own computer or it might be accessed over a network connection (e.g., via LAN, WAN, etc.) such as is often done.

The workflows, additional specifications and individual embodiments regarding the instant invention will be described in more detail below.

Figure 1:
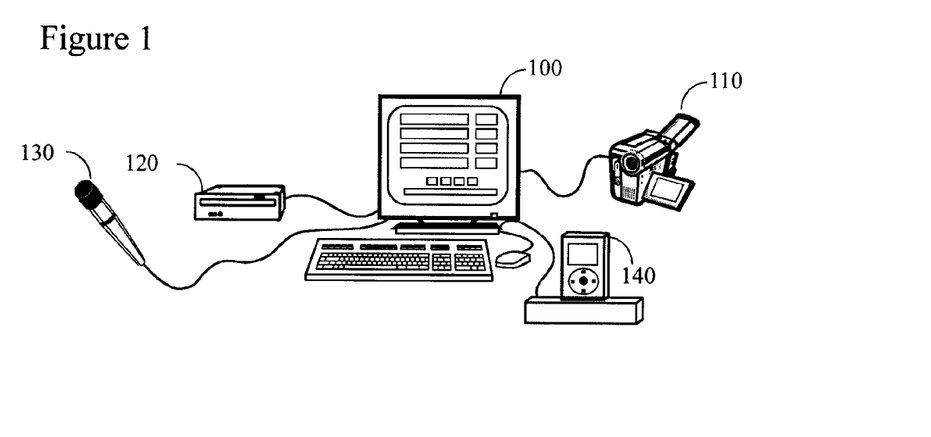
FIG. 1 depicts the general working environment of the instant invention.

As is generally indicated in FIG. 1, at least a portion of the instant invention will be implemented in form of software running on a user's computer 100. Such a computer will have some amount of program memory and hard disk storage (whether internal or accessed via a network) as is conventionally utilized by such units.

Additionally, it is possible that an external camera 110 of some sort will be utilized with and will preferably be connectible to the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further, given the modern trend toward incorporation of cameras into other electronic components (e.g., in handheld computers, telephones, laptops, etc.) those of ordinary skill in the art will recognize that the camera might be integrated into the computer or some other electronic device and, thus, might not be a traditional single-purposes video or still camera. Although the camera will preferably be digital in nature, any sort of camera might be used, provided that the proper interfacing hardware between it and the computer is utilized. Additionally, a microphone 130 might be utilized so that the user can add voice-over narration to the multimedia work and a CD or DVD burner 120 could be useful for storing individually selected user data/content. Additionally to that, a portable music device 140 or at least a portable device capable of playing back digital music files will preferably be connected or connectible to the computer to allow the user to exchange digital music files between the computer and the portable device.

Figure 2:
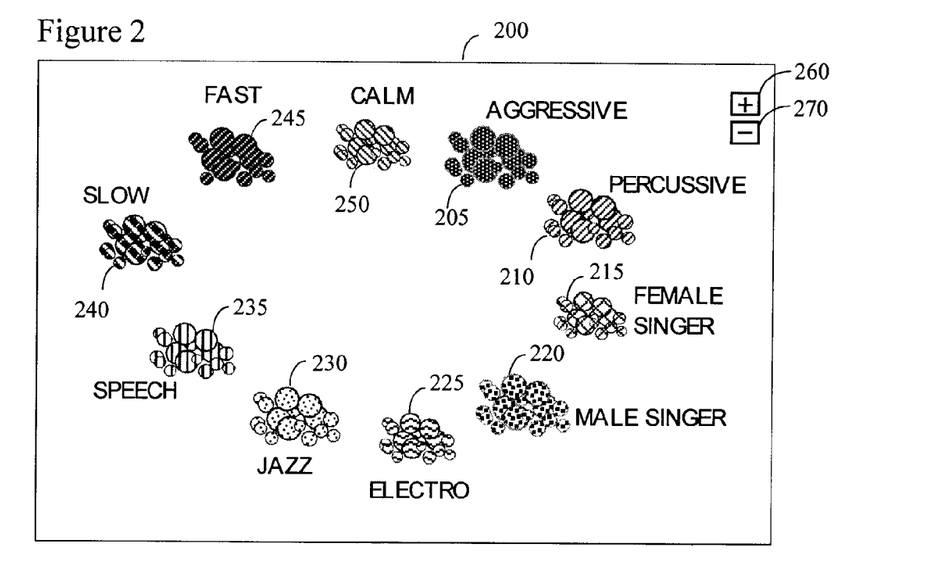
FIG. 2 contains a preferred screen configuration that would be used when displaying aspect clusters.

Coming next to FIG. 2, this figure illustrates a preferred graphical user interface of the visual music classification system of the instant invention as it will be presented to the user 200. In a preferred arrangement, the user will begin by selecting an arbitrary number of the calculated (or selected, identified, etc.) characteristics or "aspects" associated with various of the music items stored in the database. For example, the user might select "calm" and "jazz" or "aggressive" and "techno." These aspects concern characteristics of some or all of the music items in the database and will preferably have been generated by an automated analysis of each item in the user's music collection. That being said, in some instances the user might supply the aspect data item or overrule an automated calculation (e.g., if the algorithm has determined with high probability that the song singer is "female" and the user knows that this is not correct). The analysis step will preferably produce raw data values for each music item that can then be further mathematically processed and compared with predetermined threshold values during the steps that follow. In this way, each music item can be assigned to at least one aspect category. Note that it is certainly possible that a music item might be assigned to more than one category. For example, a music item might be assigned to the categories female singer, jazz, and slow. These assignments will make it possible to efficiently characterize the contents of the user's music database. Each music item will be stored in the database and the extracted and processed values for each aspect will also preferably be stored within the database associated with the corresponding music item.

After the desired musical aspects have been selected, the instant invention will preferably search through the database and select those items for which the confidence value of the calculated aspect is greater than a predetermined value, for example 80%. An on-screen display will then preferably be created 200, where the music items that possess the aspect selected by the user will preferably be displayed as a collection of colored circles or other icons in a so-called cluster organization. Such an on-screen display will also preferably feature a zoom function which allows the user to view the music items in greater detail (zoomed-in) 260, or, if desired, a more global view can be requested (zoomed-out) 270 which allows the user to see the whole music database in one display.

In the preferred embodiment, each circle in the display will represent one music item and the size of the circle will be used as an indicator for the magnitude of the confidence value, e.g., a larger circle will signify a greater confidence that a given music item has characteristics that correspond to that aspect. In some preferred embodiments confidence intervals of 95% or 100% will be associated with larger circles. In some cases the horizontal distance of each icon from the centroid of the cluster might reflect its relative distance from the group mean (or median, mode, etc.). Additionally, in some cases the vertical distance of each icon from the center of the cluster might reflect its variability (e.g., either with respect to the cluster, or as measured from multiple analysis windows within the music item). In other instances, the icons might be randomly placed around the cluster centroid or deterministically placed according to the preferences of the programmer or user. Of course, other means of obtaining "X" and "Y" coordinates relative to the location of the centroid of a given music aspect could readily be devised by those of ordinary skill in the art. In FIG. 2, the user has selected the following musical aspects for display: aggressive 205, percussive 210, female singer 215, male singer 220, Electro 225, Jazz 230, Speech 235, slow 240, fast 245 and calm 250.

It should be noted that the aspects that are determined for each music item will preferably be features that describe or relate to the character of the music. In the preferred arrangement, there are two broad categories of such aspects: aspects that are easily comprehensible (and determinable) by a novice user and aspects that describe fundamental musical characteristics of the audio content, some of which may only be determined by calculation As examples of the sorts of aspects that might be utilized by the instant invention—including both those that are more accessible to and comprehensible by the user as well as those that will likely be determined by computation—attention is directed to the following general categories: instrument density, solo instrument (i.e., whether or not this is a solo work), mood (dark, light, upbeat, etc.), music color (i.e., timbre of the voice(s)), percussiveness (i.e., whether or not there is an obvious beat or a dominance of percussive instruments), singing vs. speaking, musical style (country, jazz, rock, electro, etc.), tempo, etc.

Associated with each of these categories will preferably be two or more possible values. For example, with respect to "instrument density", two possible attributes values are "sparse" and "full" with "full" being associated with a full orchestra or similar sound and "sparse" being associated with a solo or a few instruments (e.g., a piano solo). With respect to the "mood" category, some possible values for this parameter are aggressive, calm, chilling, danceable, dramatic, energetic, happy, melancholic, stressful, etc. With respect to "female singer", the preferred possible values are "yes" and "no".

In addition to these sorts of category/value combinations, there are category values that might be determined algorithmically. For example, tempo/beats per minute (BPM), dynamic range (high volume minus low volume), key signature, etc., might all be reliably automatically calculated without user intervention. Those of ordinary skill in the art will be able to readily devise additional alternatives.

According to one aspect of the instant invention, there is provided a method of calculating the degree of confidence associated with a category value. Although this might be done in many ways (and those of ordinary skill in the art will readily be able to devise other approaches different from those presented here), the following is the preferred approach. Preferably, a window length in time will be selected. The length might be very short (e.g., a few seconds) or as long as the length of the song. However, preferably the window length will be chosen so that more than one window is required to cover the entirety of the song (e.g., analysis windows several seconds in length that optionally overlap at least somewhat in time). Then, an attribute value (e.g., BPM) will be determined in a first window that will preferably coincide with the start of the song. Next, the analysis window will be moved deeper into the song and the determination repeated. In this way, multiple measures of the same attribute will be obtained for a single song. Those multiple attribute values will then preferably be used to calculate a composite (e.g., average) attribute value for the entire song. Additionally, the distribution of attribute values calculated from different windows will be used to calculate the degree of confidence in the attribute value. Measures of determining the degree of confidence in such an attribute value are well known to those of ordinary skill in the art (e.g., the mean deviation, t-tests, variance of the mean, non-parametric confidence intervals, coefficient of variation, etc.).

Given a collection of attribute values a confidence value will preferably be determined. In a first preferred embodiment, the confidence value will be determined by noting the length of time (e.g., number of windows) that the musical work is in a particular category. For example, if 60% of the attribute values indicate that singing is occurring and 40% are without singing, the song will be characterized as "singing" but the confidence level will be low as compared with a situation where the 90% of the attribute values indicate "singing". In some preferred embodiments, the percentage of time associated with the most common attribute value will be the confidence interval of the measure, e.g., 60% and 90% respectively in the previous examples. In instances where the attribute is a more numerical one (e.g., BPM) the previous method might be used or, alternatively, the multiple calculated attributes might be used to formulate a histogram, sample variance, etc., from which the variability and, hence, a degree of confidence, might be established.

Figure 3:
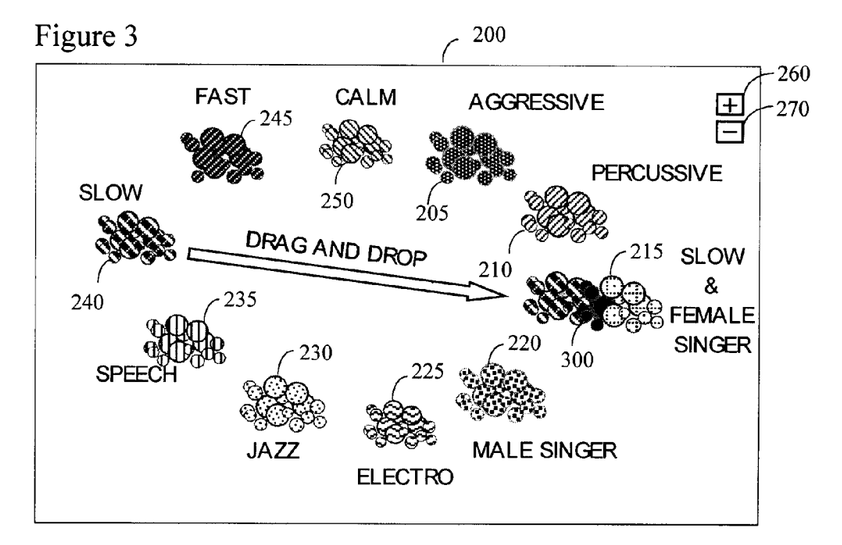
FIG. 3 contains an illustration of how a user might search the song database for songs that are both "slow" and "performed by a female singer".

Turning next to FIG. 3, this figure illustrates a possible user interaction to search for particular music items in the music database. The user interaction will preferably be carried out according to the well known drag and drop principle. That is, the user will preferably select an aspect cluster, in this figure the "slow" aspect cluster 240 and then drag and drop it on top of a different aspect cluster 215. This operation will preferably select those music items that have characteristics for both aspects. The instant invention will then automatically determine those songs that have these characteristics above a certain threshold value, or with a certain predetermined confidence value, thereby generating the intersections of these two clusters of music items. In some instances, the threshold or confidence value might be about 50%. The musical items which feature both aspects at the required confidence level will then preferably be displayed using a different color, or pattern 300, thereby indicating to the user which music items satisfy both aspects. Of course, once the desired music items have been located, one or more could be immediately performed for the user, used to construct a playlist, copied to a different location, burned to a CD, etc. Those of ordinary skill in the art will recognize that this collection of music items could be used in any way that is conventionally, or unconventionally, done.

In the example of FIG. 3, a user seeks to locate the music items in the database that have "slow" tempo 240 and are sung by a female lead singer 215. In that case, the user would use the mouse, a track pad, or any other hardware pointing device, to include any other conventional or unconventional interaction technology (e.g., a touch sensitive screen) to drag the cluster associated with "slow" to the opposite side of the graphical user interface to the cluster designated as "female singer" and then drop it on top of the "female singer" cluster. The instant invention will then preferably graphically accentuate the icons that correspond to music items that satisfy both criteria. Preferably only those items that exhibit both aspects at some predetermined degree of confidence (e.g., 50%) will be colored in a darker (or different) shade to signify to the user those music items that are within the intersection of the two clusters. If a user clicks on or otherwise selects a graphical object that is within the intersection, the instant invention will preferably respond by, for example, displaying the song title, playing the selected song, inserting the selected song into a play list, copying it to a different storage location for further processing, etc.

Figure 4:
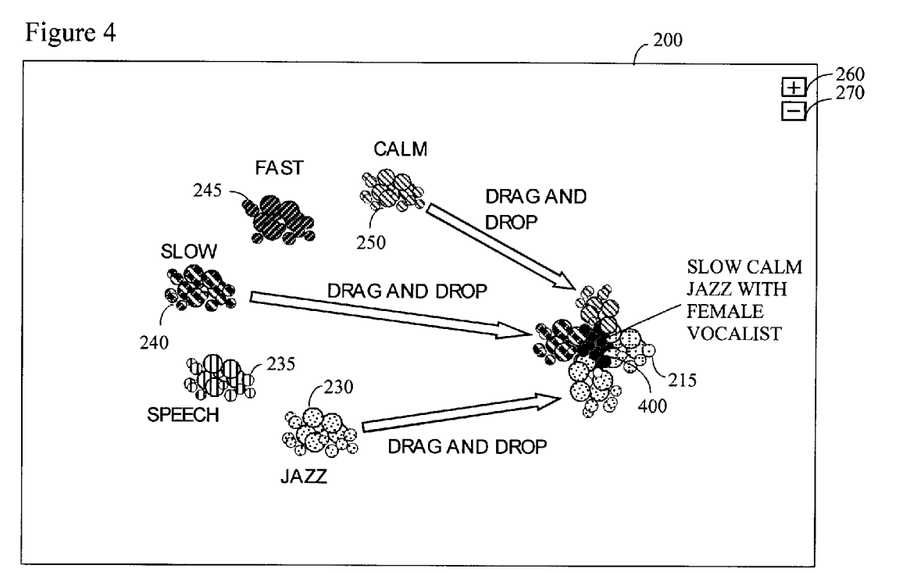
FIG. 4 illustrates how a user might search for songs that satisfy multiple criteria.

Coming now to FIG. 4, this figure illustrates some additional preferred options that might be available to the user when searching the music database. As an initial matter, the instant invention will preferably not be limited to only combining two clusters of aspects of music items. It will preferably be possible to combine any number of clusters to obtain those music items that represent the intersection of all of the associated aspects above a certain confidence value. In FIG. 4 for example, the user seeks to locate the music items that are "slow" 240, represent a "calm" 250 mood, belong to the "Jazz" 230 genre and feature a "female singer" 215. In this example, the user will select each aspect cluster and drop it on top of the others. The instant invention will preferably automatically manage the arrangement of the multiple clusters in relation to each other. Furthermore the instant invention will preferably accentuate those music items in the intersection. As was described previously, preferably only those items that are classified at a predetermined confidence level with respect to all of the screening criteria will be emphasized in the visual representation. The instant invention will also preferably arrange the corresponding graphical items in the intersection to lie in the middle of the cluster accumulation 400. By clicking or otherwise selecting the emphasized graphical objects, the user will be able to access the search results.

Figure 5:
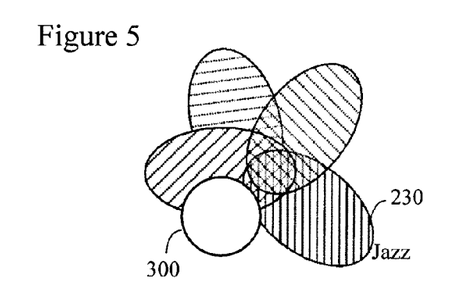
FIG. 5 displays an expanded view of the blossom created by searching for multiple criteria.

Turning next to FIG. 5, this figure depicts the preferred cluster accumulation of the instant invention in greater detail. The processes of the instant invention will generate graphical "blossoms" that represent the music items. The outer rim (petals) of the "blossom" will preferably depict the aspects that have been selected by the user for use in the search. In the example of FIG. 5, the screening criteria are the "Jazz" genre 230 and the "slow" tempo 240. In the middle of the graphical "blossom" of FIG. 5, the user will find those music items 300 that belong to both aspect criteria according to a predetermined degree of confidence. With every aspect cluster that is added, the instant invention will preferably automatically adapt the "blossom" in size and dimension. Such a "blossom" display is an intuitive and unique representation of the music items of a large database.

Figure 6:
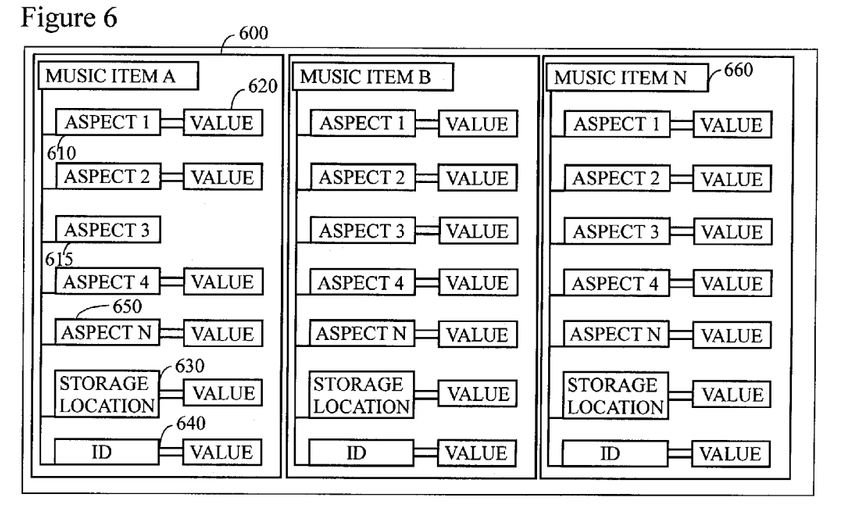
FIG. 6 contains an illustration of the preferred structure of the database used in the instant invention.

Coming now to FIG. 6, this figure illustrates a preferred embodiment of the structure of the music database used by the instant invention. A music item will preferably be stored in the database 600 as a data construct that contains the music item and a plurality of data values that describe it. Each music item might have a number of aspects 610 assigned to it. It should be noted that the labels "Aspect 1," "Aspect 2," and so on, have been selected for purposes of illustration only. In practice, these aspects might be labeled "Slow," "Percussive," "Genre," "Artist," and so on. The aspects will preferably be a mixture of calculated values and values extracted from the metadata of each music item. At the time a music item is added to the music database, the instant invention will preferably conduct an analysis of that item to obtain a data set that describes it in some sense. Thus, each aspect will preferably have a value 620 associated with it. The generation of these values will preferably be carried out by comparison of the calculated values for a specific property of the music item with a predetermined value. So, for example, if the analysis of a music item yields a median BPM (beats per minute) value of 120, this value would then be compared to a table that classifies a BPM value over, say, 110 as being "fast" in terms of tempo. So, the instant invention will then preferably classify the music item as "fast" and store the value "110."

The metadata of a music item will typically directly be used as aspect data 620 rather than using it in a further calculation. For example, the genre data will preferably be extracted from the metadata and stored as an aspect. Additionally in some preferred embodiments the instant invention will automatically determine the genre of a music item by comparing its extracted data values with reference data ranges that describe each of the genres and that have been provided by, for example, the software developer. The number of aspects that might be stored for a music item illustrated in FIG. 6 (i.e., four aspects) is not intended to be limiting, hence the use of the designation "Aspect N" 650 to indicate the possibility that the number of aspects might be arbitrarily large. Additionally, the data construct will also preferably contain the storage location of the music item 630 and an ID 640. The ID will preferably be used for identification of the music item when it is accessed by the user. The database will preferably store a multitude of individual music items as is suggested by the label "Music Item N" 660.

Figure 7:
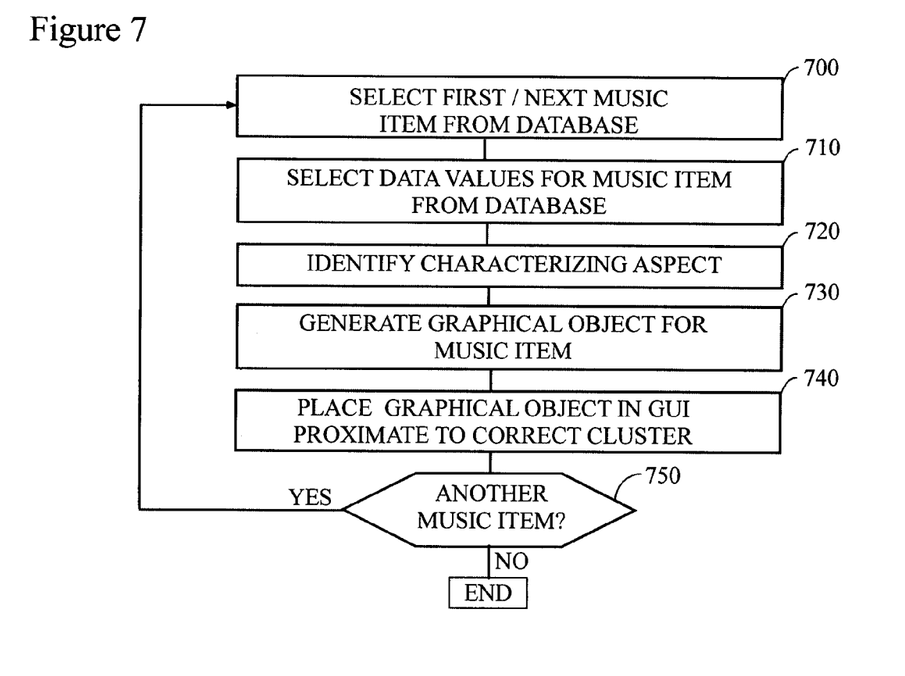
FIG. 7 displays a flow chart containing the preferred steps involved with generating the graphical user interface.

Turning next to FIG. 7, this figure illustrates a preferred process that will be carried out when the graphical user interface is generated. The processes will preferably be carried out automatically without input from the user. Although this process is described for a single music item, it should be noted that these processes will preferably be carried out for every music item in the database.

As a first preferred step, the instant invention will preferably select a music item from the database 700. Next, in a preferred step, the instant invention will preferably access the data set for that music item and read the data values that describe the aspects of the music item 710. In the next preferred step, the instant invention will preferably select the characterizing aspect of the music item 720. A "characterizing" aspect is a musical property that can be calculated, determined, or inferred from a digital music item and that is present (or absent) at some level of confidence, statistical significance, etc. The instant invention will preferably determine a characterizing aspect for a music item by selecting an aspect that has a data value which has a high, or in most cases the highest, confidence value as compared with the other aspects of that music item. In some embodiments, a characterizing aspect will be selected by reference to an arbitrary order devised by the programmer or user. Note that it is possible for a music item to have multiple high-confidence characteristics that are in some sense "characterizing" because such aspects need not be mutually exclusive (e.g., consider the case where a music item features a "female singer" singing a "fast tempo" song in a "rock style", etc., all of which may have been determined with a relatively high degree of confidence). Thus, in the disclosure that follows when the "characterizing" aspect of a music item is discussed, that characteristic should be understood to potentially be one of several characteristics that represent different aspects of that music item.

For example, suppose that a music item has been classified as "fast" with BPM of 110. For this same item, the aspect "female singer" has a data value of "9" (out of 10, say) which indicates with a high degree of confidence that the singer is indeed female. In this example, the instant invention will preferably compare the data values for both aspects to predetermined comparison values. Since the data value for "fast" is relatively high, it is a good candidate for the characterizing aspect. However, the data value for the aspect "female singer" is higher in comparison, say, to the average data value for this parameter in the database and this suggests that this aspect should be used as a characterizing aspect. In some preferred embodiments, the instant invention might determine both aspects to be characterizing aspects.

In a next preferred step the instant invention will select a graphical object or icon that represents the music item 730. The dimension, size and color of the graphical object will preferably depend at least in part on the data value of the aspect, e.g., it might be given a different shape, color, shading, etc., depending on its confidence level. As a next preferred step the instant invention will display the graphical object within the graphical user interface 740 and will also store an ID value of the music item so that it can be later associated with that graphical object. Additionally, the instant invention will preferably place the name of the aspect near the graphical object within the GUI. The screen coordinates, the characterizing aspect, and the ID value of each graphical object will preferably be stored so that they can be recalled later when it becomes necessary to identify individual music items that have been selected via the on-screen display.

Preferably, every music item in the database (or some portion of the database) will be examined in turn to identify its (usually most significant) characterizing aspect (i.e., decision item 750 followed by a branch to step 700). In the course of reviewing the music items in the database, typically a number of different characterizing aspects will be identified.

Of course, in a database of any size there will typically be multiple music items that exhibit the same characterizing aspect. The preferred display arrangement will group together on the screen the icons that are representative of music items that have the same characterizing aspect, thereby giving rise to a cluster of songs for each such aspect. Note that in some cases, rather than having the base set of aspects be determined on the fly, a user (or a programmer, etc.) might specify in advance those aspects that are to be sought out in the database. Then, music items that do not exhibit any of the specified aspects at the required confidence level might be, for example, left off of the display. For example, the user might be looking for songs that feature a "female rock" singer. In that instances, the user might specify in advance that only music items in the database that exhibit the "rock" or "female" aspect at some level of significance should be displayed and, in this example, only two clusters would be produced on-screen. In other preferred arrangements, every music item would be placed somewhere on the screen according to its most significant characterizing aspect, no matter what confidence level is associated with that aspect.

Figure 8:
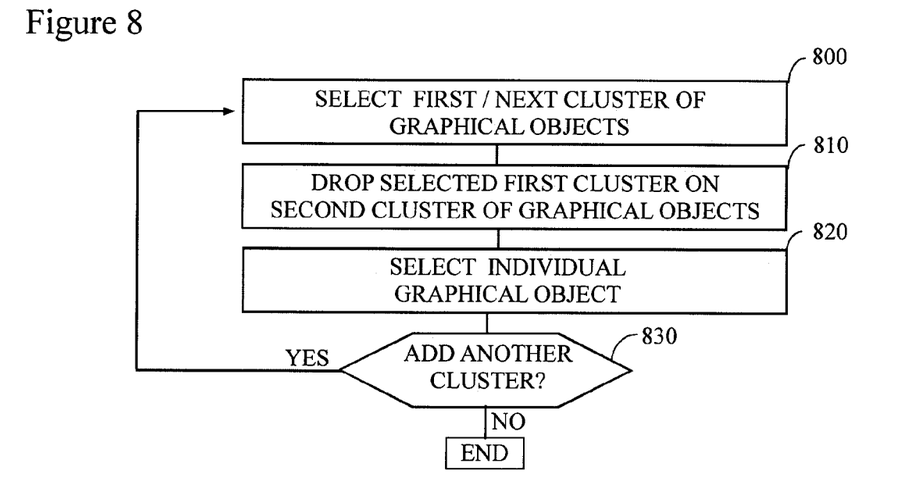
FIG. 8 contains a flow chart representing the preferred steps that connect with the actions of the user.
Figure 9:
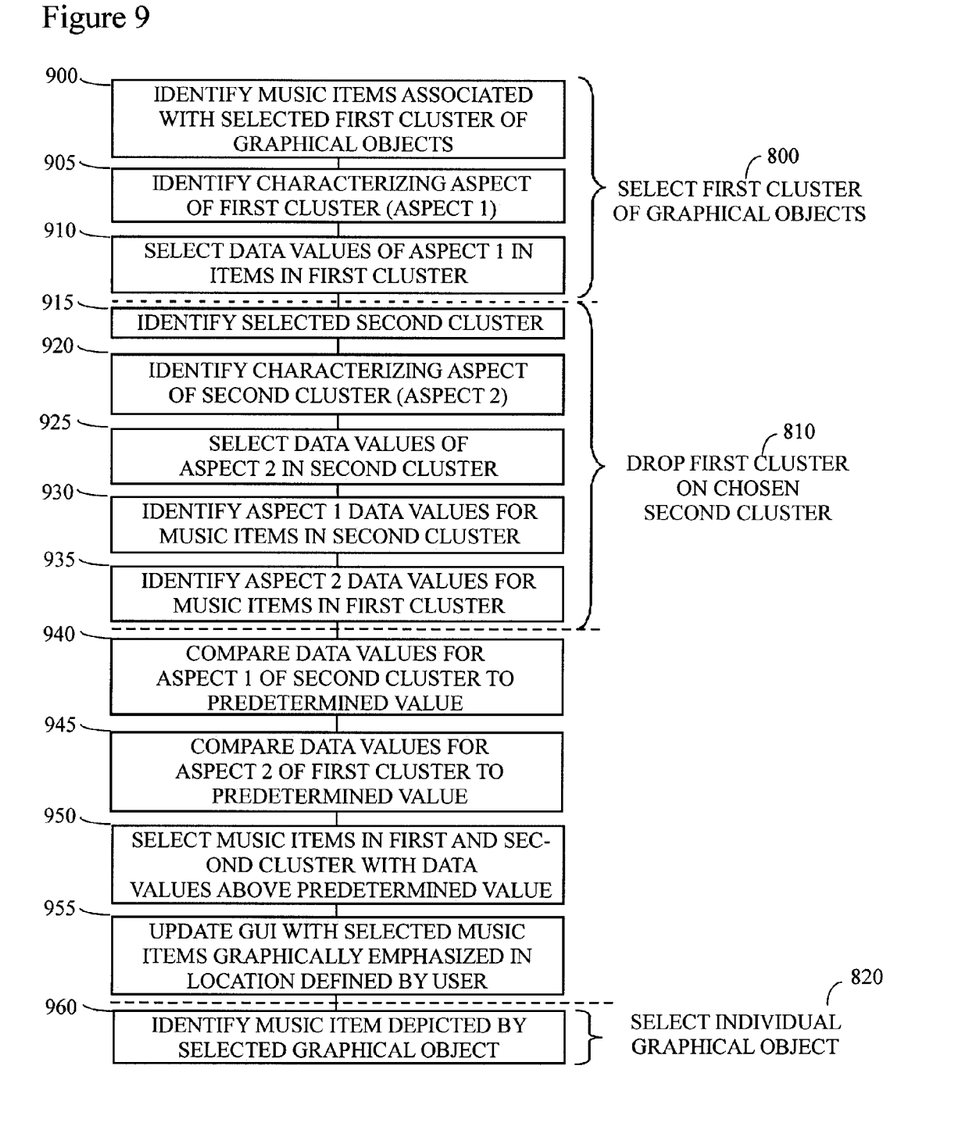
FIG. 9 depicts a preferred sequence of steps carried out by the instant invention after receipt of user instructions.

Turning next to FIG. 8, this figure illustrates the preferred options that will be available when a user initiates a search of the music database. Of course, many of the tasks performed by the instant invention will not generally be visible to the user. FIG. 9 and its associated discussion illustrate some of these sorts of tasks. With respect to FIG. 8, in a first preferred step the user will select a first cluster of graphical objects from the onscreen display 800. This is preferably carried out by using the mouse or keyboard of a personal computer. It is also possible, of course, to use alternative methods of selection, e.g., a touch screen, touch pad, joy stick, etc. In a next preferred step the user will drop the selected first cluster on a second cluster of graphical objects 810. Next, the user will preferably select an individual graphical object from the combined clusters 820. In some cases, the user might elect to add an additional/further cluster to the existing combination (e.g., the "YES" branch of decision item 830). In such case, the instant invention will allow the user to select additional clusters for inclusion with the currently combined clusters.

Turning next to FIG. 9, this figure illustrates some tasks that will preferably be performed by the instant invention when creating and updating the visual presentation of the music items of the database. For purposes of clarity, note that the user actions described in connection with FIG. 8 have been added to FIG. 9. After the selection of the first cluster of graphical objects 800, in a first preferred step the instant invention will identify the music items 900 that have icons within the selected cluster. This will preferably be done using the previously stored ID value of each individual music item which might be stored in RAM, in volatile (or non-volatile) storage, etc. In a next preferred step, the instant invention will determine a characterizing aspect of each music item in the first cluster 905 ("Aspect 1"). The characterizing aspect will be identified by reference to the previously stored data values for each graphical object. In a next preferred step, the data values of Aspect 1 for each music item in the selected first cluster will be identified 910.

After the user has dropped the selected first cluster on a second cluster of graphical objects 810, the following steps will preferably be initiated. The instant invention will preferably identify the selected second cluster of graphical objects, i.e., it will determine where the user dropped the first cluster 915. This will preferably be accomplished by comparing the screen coordinates of the dropped cluster with the location coordinates of the other clusters in the display. In a next preferred step the instant invention will identify the characterizing aspects of the music items in the second cluster of graphical objects 920. Once again, the instant invention will preferably determine the ID values of the graphical objects, and identify the associated music items and the base characterizing aspect associated with the second cluster ("Aspect 2"). As a next preferred step, the Aspect 2 data values second cluster will preferably be read from the database 925. Once again, the ID value for each music item will preferably be used to retrieve the data necessary to determine its characterizing aspect.

As a next preferred step, for each music item in the first selected group the Aspect 2 data values will be accessed. Similarly, the Aspect 1 data values in the second cluster will be accessed, i.e., steps 930 and 935. For the music items in the first cluster the data values associated with the characterizing aspect of the second cluster will be selected and for the music items of the second cluster the data values for the characterizing aspect of the first cluster will be selected. In the next step, the instant invention will preferably work with the data values of both characterizing aspects for both selected clusters.

Next, the extracted data values for both selected clusters will preferably be compared using a predetermined threshold or confidence value 940, 945. The confidence value will preferably be chosen to differentiate the music items from each other. For example, music items in both clusters that have Aspect 1 and Aspect 2 data values that are above the confidence value might be identified 950. Then, the instant invention will preferably update the graphical user interface 955 accordingly. This update will preferably comprise of graphically emphasizing the identified music items by, for example, using a bright color for the graphical objects.

In a last step of the preferred method, the instant invention will identify and select those music items that are emphasized in the visual presentation 960. This step will preferably be initiated after the user has selected an individual graphical object 820.

CONCLUSIONS

Of course, many modifications and extensions could be made to the instant invention by those of ordinary skill in the art. For example in one embodiment the graphical objects in the on-screen presentation might be displayed multiple times, with each aspect cluster containing all the music items in the database. In this case, the search and selection process might be initiated by placing graphical objects representing desired threshold values onto the aspect clusters to filter out those graphical objects/music items that have musical properties different from those selected by the user. In another preferred embodiment one graphical object might depict one music item and the visual presentation might contain all the graphical objects representing all the music items in the database. It might be possible for the user to select graphical objects representing desired aspects and dropping these onto one of the graphical objects to filter out those music items that possess this aspect above a certain confidence value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of managing a plurality of digital audio items, comprising the steps of:
    (a) accessing a database comprised of said plurality of digital audio items, each of said plurality of digital audio items having a plurality of data values associated therewith, each of said plurality of data values being representative of an aspect of said digital audio item;
    (b) choosing one of said plurality of digital audio items;
    (c) identifying said data values associated with said chosen digital audio item;
    (d) using said identified data values to determine a characterizing aspect of said chosen digital audio item;
    (e) determining a screen location associated with said characterizing aspect;
    (f) displaying an icon representative of said chosen digital audio item on a display device proximate to said screen location, thereby forming an aspect cluster;
    (g) performing steps (b) through (f) until sufficient digital audio items are chosen to produce at least two different aspect clusters that each have a plurality of digital audio items associated therewith;
    (h) selecting a first one of said aspect clusters on the display device, said first aspect cluster having a first characterizing aspect associated therewith, said first aspect cluster having a first plurality of digital audio items associated therewith;
    (i) dragging on said display device a representation of said first aspect cluster to a screen location proximate to a second aspect cluster, said second aspect cluster having a second characterizing aspect associated therewith, said second aspect cluster having a second plurality of digital audio items associated therewith;
    (j) selecting a confidence level;
    (k) identifying which of said first plurality of digital audio items possesses said second characterizing aspect at said confidence level;
    (l) identifying which of said second plurality of digital audio items possesses said first characterizing aspect at said confidence level;
    (m) using any of said identified digital audio items in said first plurality of digital audio items or said second plurality of digital audio items to form a playlist; and,
    (n) performing for a user at least a portion of said playlist.

2. The method of managing a plurality of digital audio items according to claim 1, wherein said characterizing aspect is a characteristic musical property of an associated music item.

3. The method of managing a plurality of digital audio items according to claim 1, wherein said step (i) comprises the step of:

(i1) dragging on said display device a representation of said first aspect cluster to a screen location proximate to a second aspect cluster, said second aspect cluster having a second characterizing aspect associated therewith, said second aspect cluster having a second plurality of digital audio items associated therewith, wherein said dragging is performed using hardware selected from a group consisting of a computer mouse, a track pad, a keyboard and, a touch sensitive screen.

4. The method of managing a plurality of digital audio items according to claim 1, wherein said plurality of data values being representative of an aspect of said music item are selected from a group consisting of a singer gender, a music style, an overall pitch, a key, and a tempo.

5. The method of managing a plurality of digital audio items according to claim 1, wherein step (c) comprises the step of:
(c1) reading from said database said data values associated with said chosen digital audio item.

6. The method of managing a plurality of digital audio items according to claim 1, wherein step (m) comprises the step of:
(m1) combining said identified digital audio items with respect to said first aspect cluster and said identified digital audio items with respect to said second cluster to form a playlist.

7. A method of managing a plurality of music items comprising the steps of:
(a) accessing said plurality of said music items;
(b) determining a characterizing aspect for each of said plurality of music items, thereby obtaining a plurality of different characterizing aspects;
(c) for each of said plurality of different characterizing aspects, determining a different screen location;
(d) displaying an icon representative of each of said plurality of music items on a display screen at a location proximate to said screen location of its determined characterizing aspect, thereby creating a plurality of aspect clusters;
(e) requiring a user to select a first aspect cluster, thereby selecting each music item having a first characterizing aspect;
(f) requiring the user to move an on-screen representation of said first aspect cluster to an on-screen representation of said second aspect cluster, thereby selecting each music item having a second characterizing aspect;
(g) for each of said selected music item having said first characterizing aspect, determining a value of said second characterizing aspect;
(h) for each of said selected music item having said second characterizing aspect, determining a value of said first characterizing aspect;
(i) selecting a confidence level;
(j) selecting from among said selected music item having said first characterizing aspect any music item which has said second characterizing aspect at or above said selected confidence level;
(k) selecting from among said selected music item having said second characterizing aspect any music item which has said second characterizing aspect at or above said selected confidence level;
(l) for each of said music items selected in steps (j) and (k), displaying on said display screen a changed icon different from said icon of step (d);
(m) requiring the user to choose at least one of said changed icons, thereby choosing at least one of said music items; and,
(n) performing any of said chosen at least one music items for the user.

8. The method of managing music items according to claim 7, wherein step (f) comprises the steps of:
(f1) requiring the user to move an on-screen representation of said first aspect cluster to an on-screen representation of said second aspect cluster using a hardware pointing device, thereby selecting each music item having a second characterizing aspect.

9. The method of managing music items according to claim 8, wherein said hardware pointing device is selected from a computer mouse, a track pad, a keyboard, and a touch sensitive screen.

10. The method of managing music items according to claim 7, wherein said plurality of characterizing aspects are selected from a group consisting of a singer gender, a music style, an overall pitch, a key, and a tempo.

11. The method of managing music items according to claim 7, wherein said plurality of digital audio items are stored in a database, and wherein step (a) comprises the step of:
(a1) accessing said database containing said plurality of music items.

12. A method of creating a playlist, comprising the steps of:
(a) selecting a plurality of different music aspects;
(b) choosing one of a plurality of digital audio items in a music database, said chosen digital audio item having at least two aspect data values associated therewith;
(c) determining from said at least two aspect data values a characterizing aspect for said chosen digital audio item;
(d) assigning said chosen digital audio item to a particular one of said plurality of different music aspects using at least said characterizing aspect, wherein said particular one of said plurality of music aspects has a particular screen location associated therewith;
(e) displaying on a display device an icon representative of said chosen digital audio item at a location proximate to said particular screen location, thereby forming a cluster associated with said particular one of said plurality of music aspects;
(f) performing steps (b) through (e) until at least two of said music aspects have at least one of said chosen digital audio items assigned thereto, thereby forming at least two different clusters each associated with a different one of said music aspects;
(g) requiring a user to select one of said at least two different clusters via said display device;
(h) requiring the user to drag on said display device a representation of said selected cluster to a screen location proximate to a different one of said at least two different clusters;
(i) identifying a first music characteristic associated with said selected cluster;
(j) identifying a second music characteristic associated with said different one of said at least two different clusters;
(k) selecting a confidence level;
(l) identifying each music item in either said selected cluster or said different one of said at least two different clusters that exhibits both said first music characteristic and said second music characteristic at a level greater than or equal to said confidence level;
(m) creating a playlist from any of said music items so identified; and,
(n) performing at least a portion of said playlist for a user.

13. The method of creating a playlist according to claim 12, wherein said step (h) comprises the step of:

(h1) requiring a user to drag on said display device a representation of said selected cluster to a screen location proximate to a different one of said at least two different clusters, wherein said drag is performed using hardware selected from a group consisting of a computer mouse, a track pad, a keyboard and, a touch sensitive screen.

14. The method of creating a playlist according to claim 12, wherein said plurality of music aspects are selected from a group consisting of a singer gender, a music style, an overall pitch, a key, and a tempo.

15. The method of creating a playlist according to claim 12, wherein step (e) comprises the steps of:

(e1) determining a degree of confidence associated with said characterizing aspect, (e2) using at least said characterizing aspect to select an icon representative of said chosen digital audio item, and, (e3) displaying on a display device said icon representative of said chosen digital audio item at a location proximate to said particular screen location, thereby forming a cluster associated with said particular one of said plurality of music aspects.

\* \* \* \* \*